United States Patent Office 3,278,507
Patented Oct. 11, 1966

3,278,507
PROCESS FOR POLYMERIZING VINYL-TERTIARY-BUTYLETHER IN THE PRESENCE OF AN ALKYL BORON DIFLUORIDE AS CATALYST
Giulio Natta and Gino Dall'asta, Milan, Italy, assignors to Montecatini Societa Generale per l'Industria Mineraria e Chimica, Milan, Italy, a corporation of Italy
No Drawing. Filed June 20, 1962, Ser. No. 203,745
Claims priority, application Italy, June 23, 1961, 11,604/61
9 Claims. (Cl. 260—91.1)

The present invention relates to the polymerization of the vinyl-tertiary-butylether to crystalline polymers.

More particularly, the present invention relates to a new type of catalysts which promote the cationic stereospecific polymerization of vinyl-tertiary-butylether to linear, high molecular weight polymers having the isotactic structure, a high degree of crystallinity and desirable chemical and physical properties.

The polymerization of vinyl-alkyl-ethers by acid type catalysts has been previously described in the literature.

Particular catalytic system of acidic nature and special polymerization conditions are also known, which promote the polymerization of several vinyl-alkyl-ethers to high linear polymers containing long segments of polymers chain having a sterically regular and isotactic structure.

Processes for the stereospecific polymerization of the vinyl-alkyl-ethers with the aid of cationic catalysts, to high molecular weight linear crystalline polymers containing isotactic macromolecules have also been described.

The cationic catalysts used according to some of the above-mentioned polymerization methods, are obtained by substituting one or more valences of a Friedel-Crafts type halide with organic groups (Friedel-Crafts modified catalysts).

According to the above mentioned polymerizations, catalysts suitable for the cationic stereospecific polymerization of vinyl ethers can be obtained from the metal halides of trivalent aluminum, tetravalent titanium, tetra- and penta-valent vanadium, trivalent chromium and trivalent iron.

The organic groups used for replacing one or more of the halides of these metals are alkyl, aryl, alkoxy radicals or radicals derived from monocarboxylic acids.

These above-mentioned catalysts, when applied to vinyl-tert.-butylether, promote the production of linear high polymers, which contain chain segments having a stereoregular, isotactic structure and which exhibit crystallinity under X-ray examination.

It is an object of the present invention to provide a process for producing polyvinyl-tert.-butylethers.

Another object is these vinyl-tert.-butylether polymers.

A further object is to provide a catalyst for this polymerization.

Other objects and advantages of the invention, will become apparent from the following description and working examples.

We have now surprisingly found that compounds having a cationic nature, but containing boron as a central metal, promote the cationic stereospecific polymerization, particularly of vinyl-tert.-butyl ether to high linear polymers containing macromolecules possessing an isotactic stereoregular structure, as defined by Natta et al.

Boron compounds of the formula, $BF_2R$, wherein R is an organic group selected from the group consisting of alkyl, aryl and alkoxy radicals, are suitable for the preparation of these polymers. Boron compounds wherein R contains up to 6 carbon atoms are particularly suitable.

We have further surprisingly found that the polyvinyl-tert.-butyl ethers obtained using these catalysts possess a remarkably higher content of macromolecules having the isotactic structure (crystallinity up to 35 to 40%) than those polymers obtained using catalysts referred to above, wherein instead of the present boron derivatives, trivalent aluminum, tetravalent titanium, tetra- or pentavalent vanadium, trivalent chromium or trivalent iron compounds are employed (crystallinity of 5 to 10%).

This fact is even more surprising when one considers that when the polymerization of the vinyl-tert.-butylether is carried out under the same conditions, but using $BF_3$ or $BF_3$-etherate catalysts, polymers having none or only a very low steric regularity and which are, therefore, amorphous under X-ray examination, are obtained.

The high stereoregularity of the polyvinyl-tert.-butylethers obtained according to the present invention, confers on these polymers special chemical and physical properties.

The polymers are in the form of solid, white, fibrous and non-tacky products.

They are insoluble in methanol, ethanol, acetone, dimethylformamide and in numerous other solvents both in the cold and at the boiling temperature of the solvents.

The polymers are insoluble at room temperature, but soluble at the boiling temperature of such solvents as dioxane and acetophenone.

They dissolve completely at room temperature in such solvents as aromatic hydrocarbons, chloroform and diethyl ether.

The melting point of the polymers, determined by means of a polarizing microscope, is between 170° and 180° C.

These polymers of the present invention possess particularly strong mechanical properties, particularly when their molecular weight is high.

Their X-ray spectrum, determined on powders and recorded with a Geiger counter, presents numerous peaks, the main corresponding to reticular distances of:

9.41 A. _____ s.
6.67 A. _____ w.
5.70 A. _____ m.s.
4.89 A. _____ w.
4.28 A. _____ w.

(s.=strong, m.s.=medium strong, w.=weak)

The degree of crystallinity of the here described polyvinly-tert.-butylethers, determined on the Geiger-counter registered powder spectra by method of comparison of the area of the crystallinity peaks with the whole area, corresponds to values up to 35–40%.

Extruded fibers of the polymers, which are warm-stretched and annealed, give a spectra of the oriented fiber with many reflections.

The poly-vinyl-tert.-butyl-ethers obtained according to the present invention have a very high stability to oxygen, light and various atmospheric agents.

The following are some non-limiting examples of the catalysts which are suitable for the polymerization according to the present invention:

mono-n-propyl-boron difluoride
mono-ethyl boron difluoride
mono-isopropyl boron difluoride
mono-n-butyl-boron difluoride
mono-n-amyl boron difluoride
boron monoethylate difluoride
boron mono-isobutylate difluoride
boron mono-n-butylate difluoride
monophenyl boron difluoride The amount of catalysts employed, can be varied within wide limits. This may vary in ratios of 1000:1 and 10:1 mols of monomer to mol of catalyst.

Particularly suitable molar ratios of monomer to catalyst are between 300:1 and 30:1.

The polymerizations can be carried out in bulk without solvents. In order to reduce the eventual local overheating and conglobations of the catalyst, however, it is advisable to work in the presence of an inert diluent, in which the catalyst can be dissolved and to which the monomer is added.

Conventional solvents or diluents such as aromatic or aliphatic hydrocarbons or mixtures thereof are particularly suitable. Thus, for example, toluene, pentane, liquified propylene and mixtures thereof may be so employed.

The polymerization is carried out at a temperature between 0° and —120° C. The especially preferred polymerization temperatures are between —30 and —80° C.

The low temperatures favor a slow and regular polymerization, which is a very important condition in order to obtain crystalline linear high polymers.

Also, for this reason, the addition of the monomer is preferably carried out slowly, thus avoiding an excessive concentration of the monomer in the liquid phase and any local overheatings due to the simultaneous polymerization of a large amount of monomer.

In addition, other procedures, which are suitable for avoiding local overheating, such as a vigorous stirring of the reaction mass or the use of very volatile diluents, can be preferably employed.

The following examples are given to illustrate the present invention, but it is to be understood that the invention is not limited thereto.

All parts and proportions are by weight unless otherwise indicated.

*Example 1*

250 cc. of anhydrous toluene and 2.5 millimols mono-n-butyl boron difluoride are introduced into a dry nitrogen-filled 600 cc. glass reactor, provided with stirrer, dropping funnel and inlet tube for the introduction of the reactants.

The mixture is cooled to —78 C. and 100 g. of pure propylene are added. While the mixture is kept at —78° C., 25 g. of vinyl-tert.-butylether, freshly distilled on metallic sodium, are introduced dropwise for 5 hours.

During this operation and up until the end of the polymerization, the mixture is thoroughly stirred.

After 20 hours, the reaction is stopped by adding 10 cc. of methanol thereto.

After having eliminated the propylene by evaporation, the residual mixture is evaporated and then is slowly poured into 1.5 liters of methanol and well stirred.

The polymer thus precipitated is separated by filtration and after a washing with methanol, is dried under reduced pressure at 80° C.

The polymer amounts to 21.5 g. (corresponding to a conversion of 86%).

The polymer is in the form of a white powder. X-ray examination (CuK$_\alpha$ radiation) on the powders registered by means of a Geiger counter, gives a spectrum whose main peaks correspond to the reticular distances of:

| | |
|---|---|
| 9.41 A. | s. |
| 6.67 A. | w. |
| 5.70 A. | m.s. |
| 4.89 A. | w. |
| 2.28 A. | w. |

The crystallization of the polymer is made remarkably easier by a thermal annealing at about 120° C. The intrinsic viscosity, determined in toluene at 30° C., is 0.3.

The polymer, when examined by means of a polarizing microscope, exhibits a melting temperature of about 170–180° C.

*Example 2*

Vinyl-tert. butylether is polymerized as described in Example 1, but using 1.2 millimoles of mono-n-butylboron difluoride as catalyst instead of 2.5 millimols. 18.0 g. (corresponding to a conversion of 72%) of a polyvinyl-tert.-butylether which is very crystalline at X-ray examination and has an intrinsic viscosity, determined in toluene at 30° C., of 0.25, are obtained.

The other properties of the polymer correspond substantially to those of the polymer obtained in Example 1.

*Example 3*

The polymerization is carried out as described in Example 1, but using 7.5 millimols instead of 2.5 millimols of mono-n-butyl boron difluoride as catalyst. 20.5 g. (corresponding to a conversion of 82%) of a polyvinyl-tert.-butylether are obtained, which is demonstrated to be very crystalline under the X-ray examination and has an intrinsic viscosity, determined in toluene at 30° C., of 0.25.

The other properties of the polymer thus obtained substantially correspond to those of the sample described in Example 1.

*Example 4*

Into the apparatus described in Example 1, which is placed under nitrogen and cooled to —78° C., 250 g. of pure liquified propylene and 2.5 millimols of mono-n-butyl boron difluoride are introduced.

When the mixture reaches the temperature of —78° C., 25 g. of vinyl-tert.-butylether, freshly distilled on metallic sodium, are introduced dropwise over a period of 5 hours.

The polymerization is carried out as described in Example 1.

After eliminating the propylene by evaporation, the polymer residue is taken up in 250 cc. of benzene, the solution is slowly poured into 1.5 liters methanol and well stirred.

The precipitated polymer is separated by filtration, washed with methanol and dried under reduced pressure at 80° C.

22 g. of polymer (corresponding to a conversion of 88%) are thus obtained. The polymer is in the form of a white powder, which is shown to be crystalline by the X-ray examination. Its properties substantially correspond to those of the polymer obtained in Example 1.

It possesses an intrinsic viscosity, determined in toluene at 30° C. of 0.45.

*Example 5*

The polymerization of vinyl-tert.-butylether is carried out as described in Example 1, but using only 250 cc. of toluene, instead of a mixture of toluene and propylene as the diluent. 20.0 g. (corresponding to a conversion of 80%) of a polyvinyl-tert.-butylether, which is very crystalline as demonstrated by X-ray examination, and has an intrinsic viscosity, determined in toluene at 30° C., of 0.45, are obtained.

The other properties of this polymer correspond to those of the polymer of Example 1.

*Example 6*

The polymerization of the vinyl-tert.-butylether is carried out as described in Example 1, but by employing a polymerization temperature of —100° C., instead of —78° C. 19.0 g. (corresponding to a conversion of 76%) of a polyvinyl-tert.-butylether, which is very crystalline under the X-ray examination and has an intrinsic viscosity (determined in toluene at 30° C.), of 0.35, are obtained.

The other properties of this polymer correspond to those of the polymer obtained in Example 1.

*Example 7*

The polymerization of vinyl-tert.-butylether is carried out as described in Example 1, but by polymerizing at a temperature of —65° C., instead of —78° C. 22.2 g. (corresponding to a conversion of 88%) of a polyvinyl-tert.-butylether, which is crystalline under X-ray examination and has an intrinsic viscosity (determined in toluene at 30° C.) of 0.48, are obtained.

Example 8

The polymerization of vinyl-tert.-butylether is carried out as described in Example 1, but using 2.5 millimols of monoethyl difluoride instead of 2.5 millimols of n-butyl-boron difluoride. 20.5 g. (corresponding to a conversion of 82%) of a polyvinyl-tert.-butylether, which is very crystalline under X-ray examination, has an intrinsic viscosity (determined in toluene at 30° C.) of 0.25, are obtained.

The polymers of the present invention because of their psysical and chemical characteristics have a wide variety of uses in the plastics field. They may be employed in various thermoplastic materials and used for the production of films, fibers and other shaped manufactured articles, if desired by admixing them with other suitable additives such as stabilizers, fillers, pigments, dyes and the like.

Many variations and modifications can, of course, be practiced without departing from the spirit and scope of the present invention.

Having thus described the invention, what it is desired to secure and claim by Letters Patent is:

1. A process for producing crystalline, linear homopolymers of poly-vinyl-tertiary-butylethers which comprises polymerizing the vinyl-tertiary-butylether monomer in the presence of a catalyst of the formula $$BF_2R$$

wherein R is selected from the group consisting of alkyl, aryl and alkoxy radicals, and contains up to 6 carbon atoms, said process being carried out at a temperature between 0° C. and −120° C. under anhydrous conditions.

2. A polymerization process according to claim 1, wherein R is an ethyl radical.

3. A polymerization process according to claim 1, wherein R is an n-butyl radical.

4. A polymerization process according to claim 1, wherein the polymerization is carried out at about −80° C.

5. A polymerization process according to claim 1 which is carried out in the presence of an inert diluent.

6. A polymerization process according to claim 5, wherein the inert diluent is selected from the group consisting of an aliphatic hydrocarbon, aromatic hydrocarbon and mixtures thereof.

7. The polymerization process of claim 6 further characterized in that the inert diluent is toluene.

8. The polymerization process of claim 6 further characterized in that the inert diluent is pentane.

9. The polymerization process of claim 6 further characterized in that the inert diluent is liquified propylene.

References Cited by the Examiner

UNITED STATES PATENTS

| | | | |
|---|---|---|---|
| 2,387,517 | 10/1945 | Kraus | 260—80.7 |
| 3,159,613 | 12/1964 | Vandenberg | 260—91.1 |

FOREIGN PATENTS 571,741  4/1958  Italy.

OTHER REFERENCES

Schildknecht et al.: Ind. and Eng. Chem. 41, 1998–2003 (1949).

JOSEPH L. SCHOFER, *Primary Examiner.*

JOSEPH R. LIBERMAN, *Examiner.*

W. G. GOODSON, H. WONG, *Assistant Examiners.*